(12) United States Patent
Mackie et al.

(10) Patent No.: US 6,879,950 B1
(45) Date of Patent: Apr. 12, 2005

(54) SYSTEM AND METHOD OF DECODING A PACKED REPRESENTATION OF MULTIPLE PARSES

(75) Inventors: Andrew W. Mackie, Los Gatos, CA (US); William Thompson, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 933 days.

(21) Appl. No.: 09/692,600

(22) Filed: Oct. 19, 2000

(51) Int. Cl.[7] ............................................... G10L 11/00
(52) U.S. Cl. ............................. 704/9; 704/10; 704/275
(58) Field of Search .............................. 704/9, 10, 275

(56) References Cited

U.S. PATENT DOCUMENTS 5,060,155 A * 10/1991 van Zuijlen ................ 364/419
6,631,346 B1 * 10/2003 Karaorman et al. ........... 704/9

* cited by examiner

Primary Examiner—Susan McFadden
(74) Attorney, Agent, or Firm—Hisashi D. Watanabe

(57) ABSTRACT

A program, system and method for decoding a packed representation of multiple parses that creates an unpacked forest to be read by a semantic interpretation module from a packed representation is provided. The packaged representation includes at least one edgenode and each edgenode includes a substitution list. A current forest object is created and is replicated for each edgenode having a substitution list containing greater than one edgenode. Each replica of the current forest object is updated with one of the edgenodes from the substitution list. Each edgenode of the packed representation is traversed using a depth-first traversal.

21 Claims, 12 Drawing Sheets

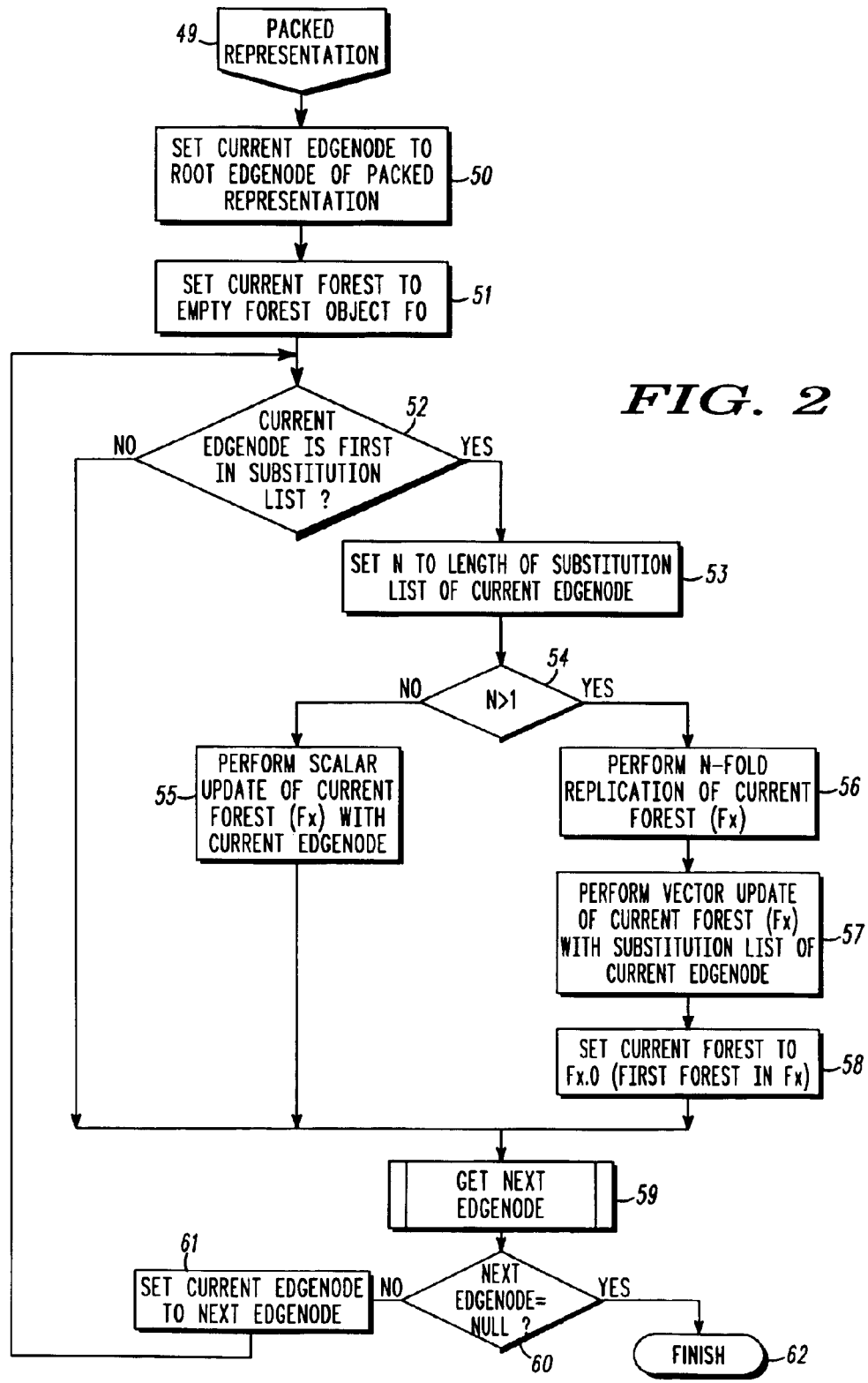

US 6,879,950 B1

SYSTEM AND METHOD OF DECODING A PACKED REPRESENTATION OF MULTIPLE PARSES

FIELD OF THE INVENTION

The present invention generally relates to natural language parsing, and more particularly to natural language parsing that is suitable for automatic speech recognition.

BACKGROUND OF THE INVENTION

In general, a semantic representation is generated from a natural-language utterance by the following process. The natural-language utterance is processed by a speech recognizer, which is coupled to a lexicon containing a plurality of words of the natural language. The speech recognizer outputs a word graph, containing at least one, and normally multiple words from the lexicon that is hypothesized to correspond to the natural-language utterance. The word graph is input into a parser, which is coupled to a grammar for the natural language. Using this grammar, the parser constructs a parse forest during the parse.

The parse forest is then inputted into a semantic interpreter, which is coupled to a knowledge base. The semantic interpreter processes the parse forest according to a predetermined semantics and outputs at least one semantic representation corresponding to the natural language utterance.

One problem with this process is that multiple word hypotheses in the word graph combined with ambiguities in the grammar may yield a large number of parses. Thus, the parse forest may become unmanageably complex. Although techniques exist to ameliorate this problem, they may remove structures that may later turn out to be useful. Alternatively, if the parse forest is packed during the parsing process, the problem of its complexity is only deferred, since an accurate and efficient means is still required to unpack the forest for processing by the semantic interpreter.

Primarily, it would be desirable to provide a method of decoding or unpacking the individual parses stored in the packed representation of a parsed word graph to yield a forest of parse trees, preferably in an order that represents their probable correctness or usefulness according to a predetermined metric.

BRIEF DESCRIPTION OF THE DRAWINGS

FIG. 2 is a flow chart of an embodiment of a top-level unpacking process in accordance with the invention;

DETAILED DESCRIPTION OF THE PRESENTLY PREFERRED EMBODIMENTS

Figure 1:
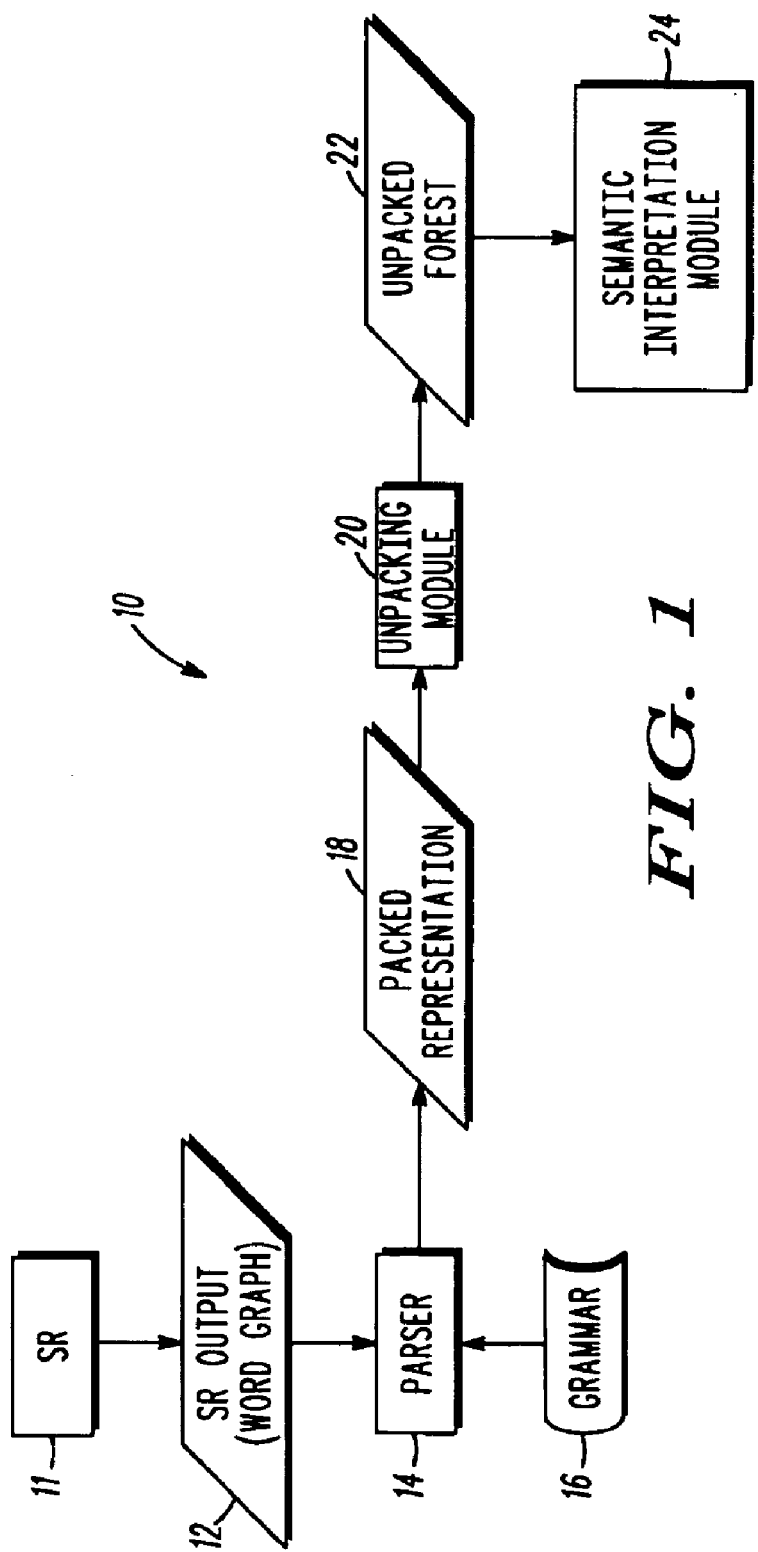
FIG. 1 is a schematic representation of a speech recognition system including a packed representation decoding module in accordance with the invention.

Referring to FIG. 1, a schematic diagram of a system 10 for encoding and decoding multiple parses is shown. The speech recognizer (SR) 11 produces output or word graph 12, which is sent to parser 14. A grammar 16 is used to produced a package representation 18 of the multiple parses. A preferred method and system for encoding the packed representation 18 is disclosed in U.S. application No. 09/054,601 entitled "Method, Device and System For Generalized Bidirectional Island-Driven Chart Parsing," now issued as U.S. Pat. No. 6,128,596, the entire disclosure of which is incorporated herein by reference. The packed representation 18 is then unpacked using the unpacking module 20 to create an unpacked forest 22 which is input to a semantic interpretation module 24. A flow chart of a preferred embodiment of the unpacking module 20 is presented in FIGS. 2 and 3A. The unpacking module 20 may include any suitable computer programming code using any conventional programming language, and may be stored on any conventional computer readable medium.

Figure 4:
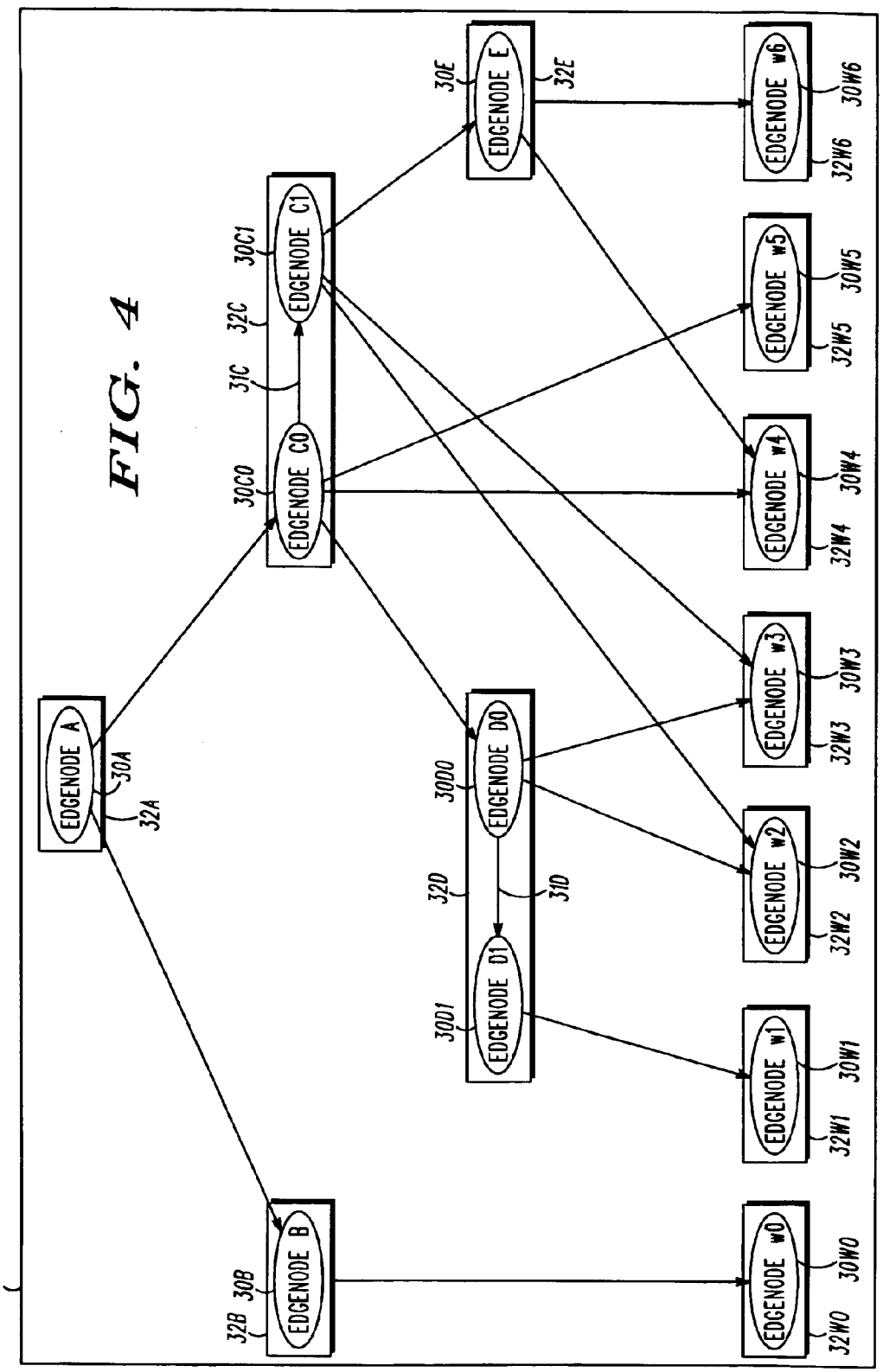
FIG. 4 is a schematic representation of a packed forest.

When the parser 14 is run in multiple-parse mode, the resulting parses are generated and stored in a packed representation 25, a simplified example of which is shown in FIG. 4. The packed representation 25 encodes: (1) a set of grammatical paths through the word graph sent to the parser 14 by the SR 11, and (2) the corresponding syntactic structures assigned to these paths by the parser 14 (the syntactic structure assigned to a path allows it to be analyzed semantically by the semantic interpretation module, which operates on the parse trees constructed by the parser). The subgraph of the SR word graph that contains the set of grammatical paths will be referred to as the "active word graph."

Figure 5:
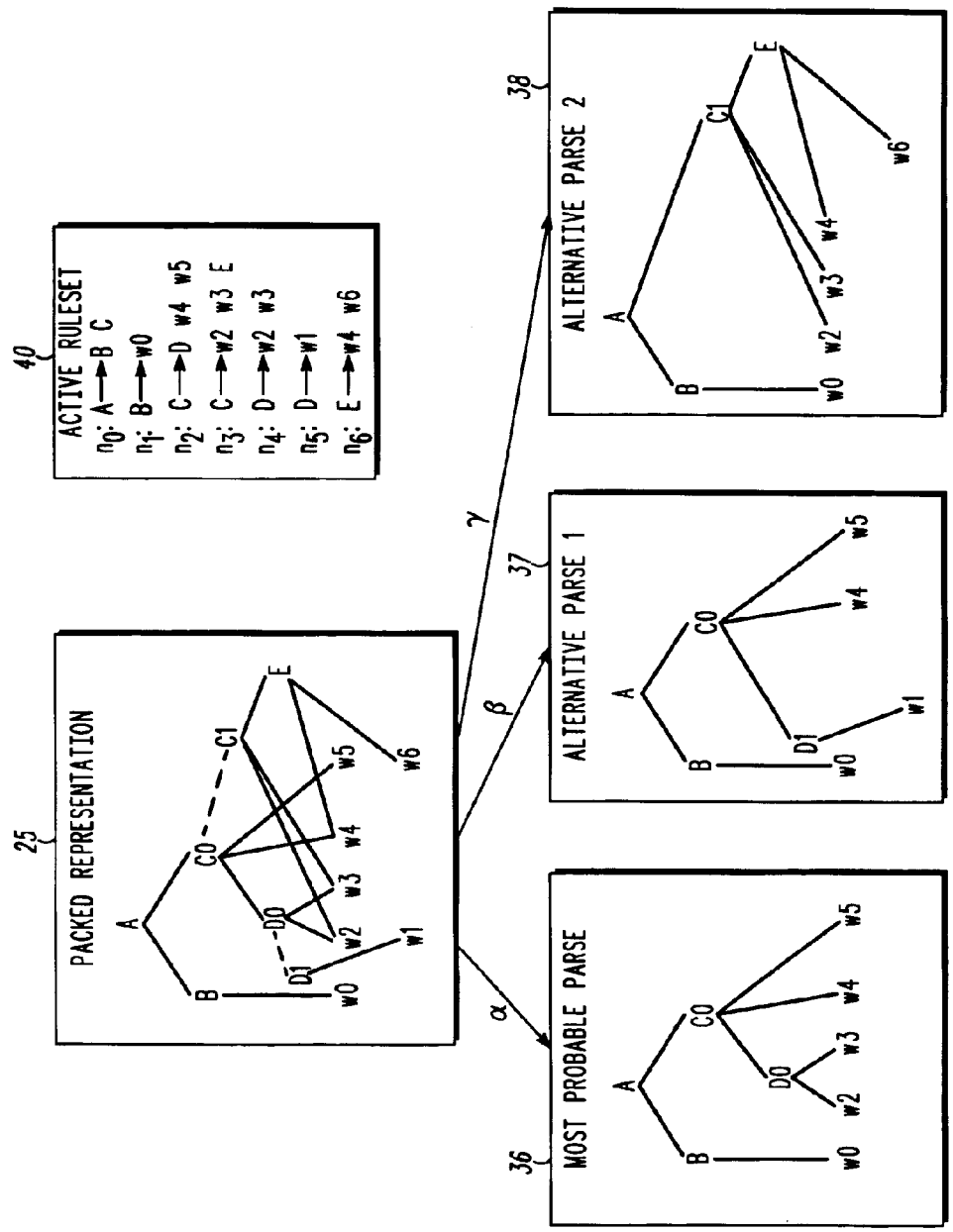
FIG. 5 is a schematic representation of the packed forest of FIG. 4 with most probable and alternative parses.
Figure 8:
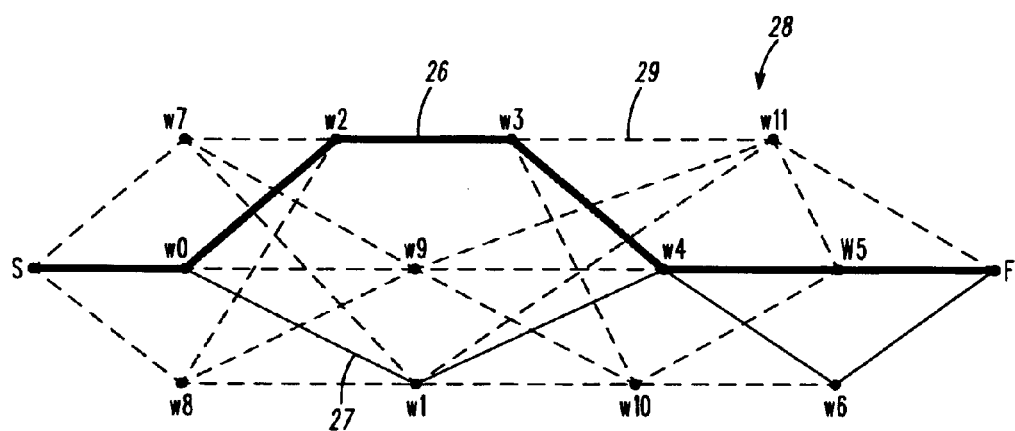
FIG. 8 is a schematic representation of a word graph output from a speech recognizer.

A simplified representation of a SR word graph 28 corresponding to the packed representation in FIG. 4 is shown in FIG. 8; the heavy lines 26 represent the "best path" through the word graph 28 (corresponding to the terminals of the most probable parse tree), while the heavy lines 26 together with the solid lines 27 represent the active word graph and the dashed lines 29 represent paths not selected by any parse. It is important to note that the active word graph may contain paths that are not selected with respect to the parses stored in the packed representation 25 (i.e., they do not have valid syntactic structures and thus cannot be analyzed semantically); in the example shown in FIG. 5, it can be seen that the path (w0, w1, w4, w6) does not correspond to a valid parse, even though it occurs in the active word graph.

The parser's packed representation 25 (see FIG. 5) consists of a hierarchically ordered set of edgenodes corresponding to complete edges from the parser's chart. The "most probable" parse tree that is returned by the parser 14 (and which provides the basis for further processing) is constructed by extracting from the packed representation 25, the information necessary to construct a treenode corresponding to the most probable edgenode at each node of the parse tree. The edge class is used by the parser for encoding the course of the parse; consequently, edge objects are relatively large and have complex behavior. Although encoding a parse tree by use of edge objects has no apparent impact on parser performance when it returns only one parse tree per input word graph, returning all possible parses in this manner may have an adverse impact on system performance. A solution to this problem is to use the C++ inheritance mechanism to split the data and behavior of the edge class into: (1) a base class ("treenode"), which contains only the data and behavior that is necessary to define and process parse trees returned by the parser, and (2) a derived class (treenode: edge), which contains all of the remaining data and behavior (required for constructing and maintaining the parses in the parser's agenda and chart objects). In the discussion that follows, the base class "treenode" will be referred to as a treenode, while the derived class "edge" will be referred to as an edgenode.

Referring to FIG. 4, the packed representation 25 consists of a subset of edgenodes corresponding to the (complete) edges in the parser's chart. Each edgenode 30 has associated with it a substitution list 32, membership in which is shown in the packed representation schematic in FIG. 4 by inclusion in a rectangle 32, with ordering in the substitution list indicated by an arrow 31 (e.g., edgenodes C0 (32C0) and C1 (32C1) are in the same substitution list 32; note that the numeric indices are used for expository purposes only, as both edges 32C0 and 32C1 represent expansions of the nonterminal symbol "C," which can be seen by reference to the active ruleset 40 (upper right-hand corner of FIG. 5).

Substitution lists 32 have the following properties: (1) each edgenode in the list has the same label (i.e., all edgenodes were generated by clauses of the same BNF (Backus-Naur Form) rule, though they may correspond to different phrase-structure rules); (2) each edgenode in the list corresponds to an edge with the same starting and ending vertices in the parser's chart (though the paths connecting these vertices may be different); and (3) the edgenodes in the list are ordered according to score, with the "best"edgenode (according to the scoring metric) being the first element of the substitution list. Given these properties, a traversal of the packed representation 25 that expands the first edgenode in each substitution list will yield the tree that corresponds to the most probable parse (lower left-hand corner of FIG. 5), the terminals of which define the best path through the active word graph 28 (heavy line in FIG. 8). This algorithm is used to obtain the best parse whether or not the parser is running in multiple-parse mode, since it is possible (and, in fact, likely) that the parser 14 will obtain multiple structures over subspans of the word graph 28 that will be incorporated into the first successful parse 14 of the word graph 28 (note that, when run in single-parse mode, the substitution list of the topmost edgenode in the packed representation returned by the parser 14 is guaranteed to contain only one edgenode).

An unordered set of alternative parses can be obtained from a given packed representation 25 by an exhaustive traversal of the representation which incorporates the processing of the substitution lists as described below. If $\{E_n\}$ is the set of n edgenodes that define the most probable parse obtained from the packed representation, and $k_i$ is the number of edgenodes in the substitution list corresponding to the edgenode $E_i$, then the number of parse trees returned by the traversal will be less than or equal to $\Pi_{i=1}^{n} K_i$. The number of parse trees may be less than this number due to dependencies resulting from the dominance relationships in the tree; (e.g. in the example shown in FIG. 5, there are only three parses (rather than four) because the substitution list containing edgenodes D0 and D1 is dominated by only one of the edgenodes in the substitution list containing edgenodes C0 and C1, not both of them).

As discussed above, the most probable parse for a given sentence is obtained from the packed representation 25 generated by the parser 14 (after it has parsed the sentence) by choosing the first element from each substitution list 32 during a traversal of the packed representation 25. An ordered set of parses may therefore be obtained from the packed representation 25 by generalizing the traversal algorithm to operate on "forests" of trees as follows: (1) each time a substitution list 32 containing more than one edgenode (e.g., 32C0, 32C1) is encountered during the traversal, replicate the partial trees in the forest currently under construction as many times as there are edgenodes in the substitution list 32; (2) update each copy of the forest with a treenode corresponding to a different edgenode from the substitution list 32; and (3) continue the traversal through each copy of the forest according to the order of elements in the substitution list 32 (thus completing the processing of all of the edgenodes below a particular edgenode in the list before moving on to the next edgenode in the list). The unpacking module 20 is an object-oriented implementation based on this algorithm.

Note that this algorithm ensures only that all of the parse trees encoded in the packed representation 25 are obtained, not that they are ordered according to probability (although the best parse, as noted above, is guaranteed to be first). This is because the algorithm generates all of the subtrees corresponding to the expansion of a given edgenode in a substitution list 32 before it generates any of the subtrees corresponding to the subsequent edgenodes in the substitution list 32. In the example shown in FIG. 5, all of the subtrees containing a treenode labeled C0 will be generated before any of the subtrees that contain a treenode labeled C1. While there is strict ordering on the first subtree in each of these sets (i.e., the subtree containing the treenodes labeled C0 and D0 is more probable than the one containing the treenode labeled C1), such an ordering does not necessarily hold for any other pair of subtrees drawn from the sets (e.g., in the example, depending on the probabilities involved, the second-most-probable tree 37 containing treenodes C0 and D1 may be either more or less probable than the most probable tree containing treenode C1 (38). This requires that each new tree, after it has been generated by the algorithm presented above, must be merged into the list of completed trees (rather than added to its end) based on its probability, in order to ensure that the final list is ordered according to the trees' probability of occurrence.

Figure 3A:
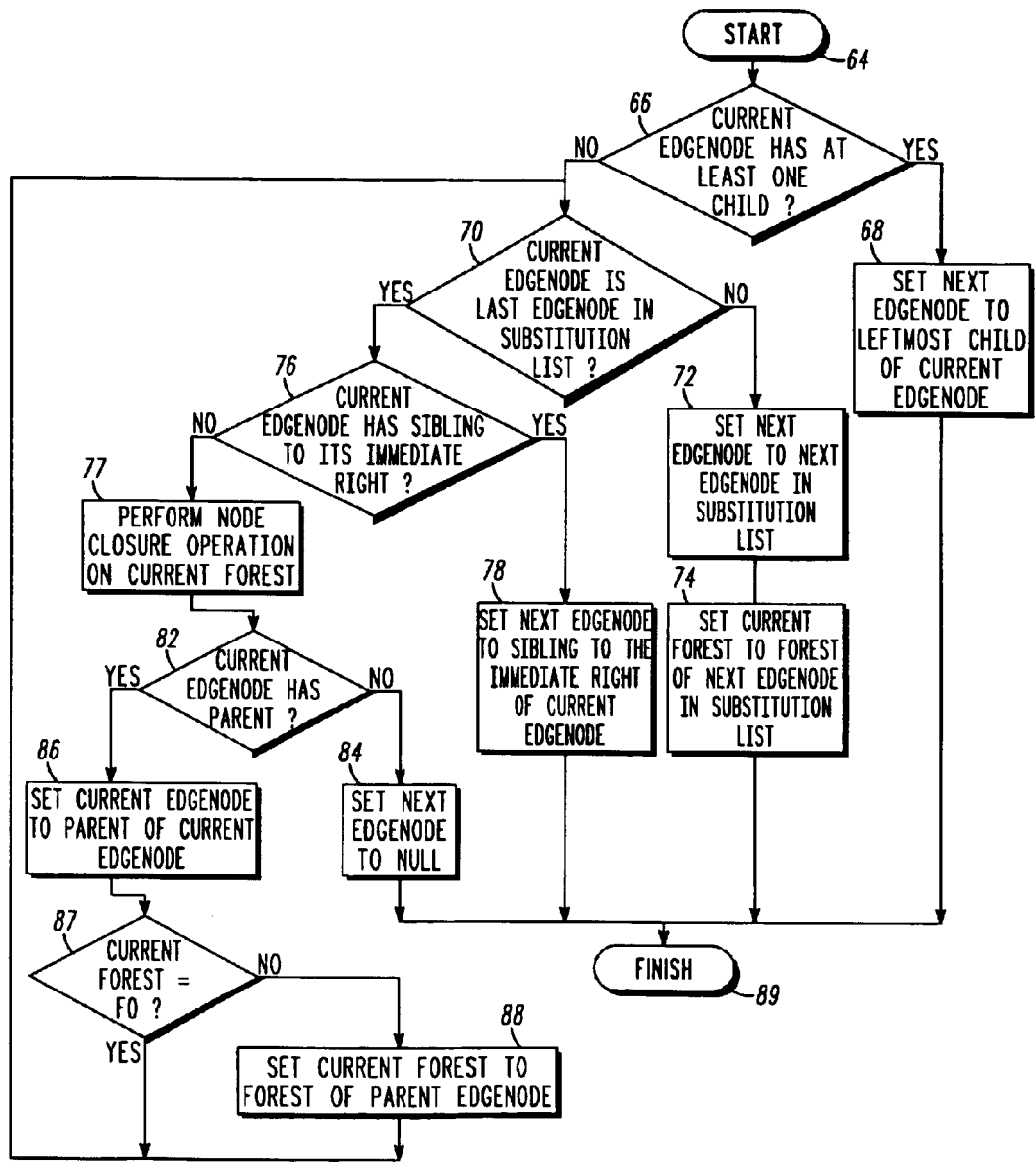
FIG. 3A is a flowchart of one embodiment of the "get next edgenode" process in accordance with the invention.
Figure 3B:
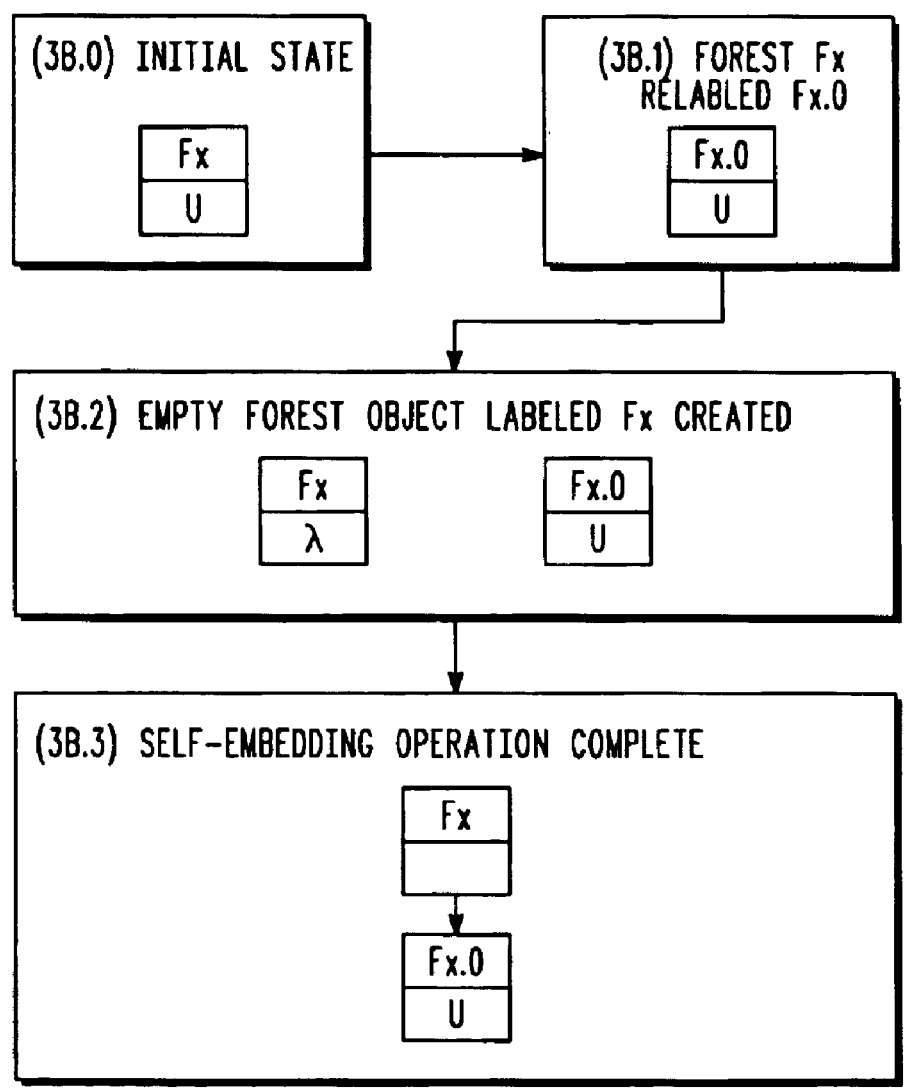
FIG. 3B is a schematic representation of the states of the self-embedding operation as defined for forest objects.
Figure 3C:
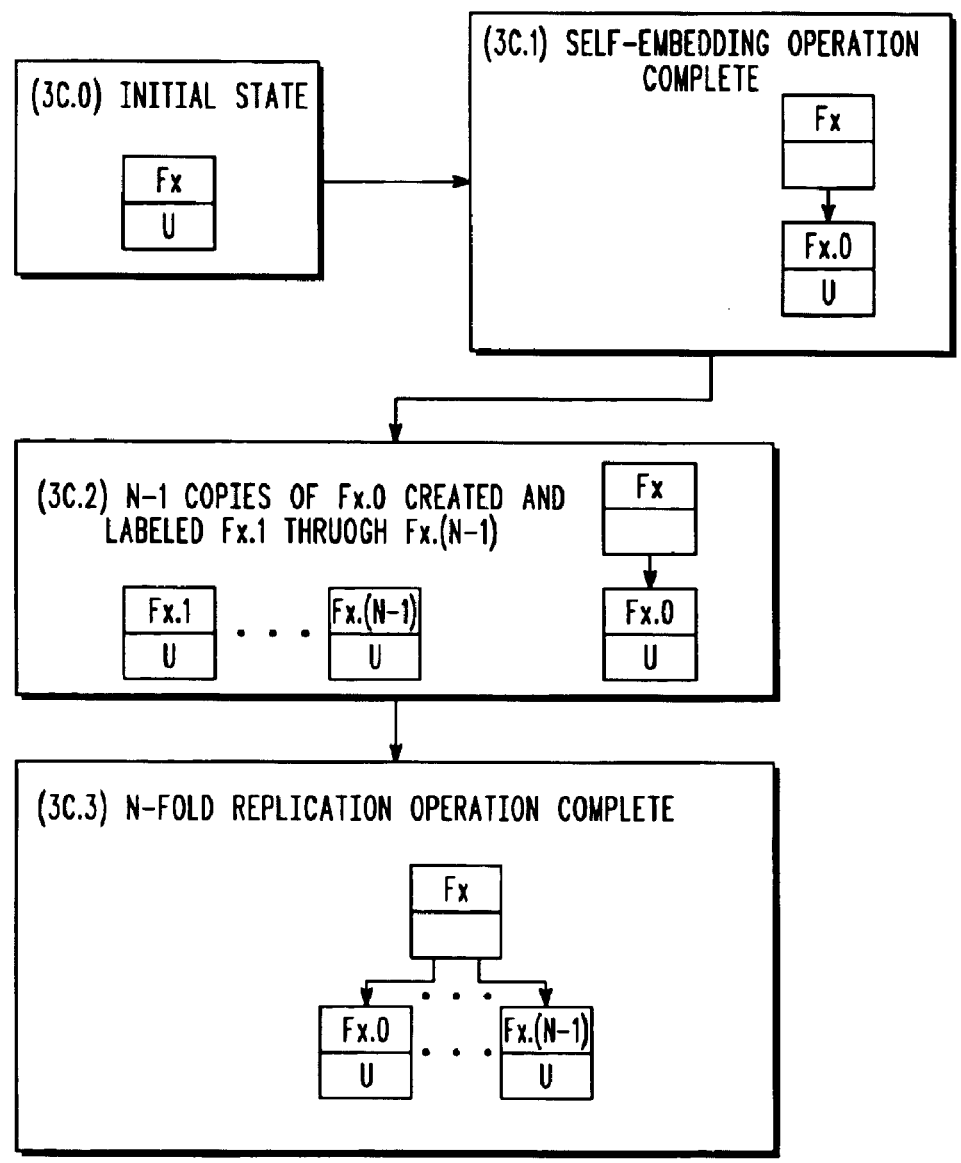
FIG. 3C is a schematic representation of the states of the N-fold replication operation as defined for forest objects.

Referring to FIGS. 3B and 3C, a forest object is represented as a box with two compartments. The upper compartment of the box contains the label of the forest object and the lower compartment of the box contains a specification of the state of the forest object as follows. A "X" in the lower compartment of the box specifies that the forest object is empty. A "U" in the lower compartment of the box indicates that the state of the forest object is unspecified (i.e., whether or not it is empty is irrelevant to the example.) If the forest object is neither empty nor in an unspecified state, then the lower compartment of the box is empty and the entire contents of the forest object is indicated by at least one arrow that connects it to at least one other forest object. If the number of forest objects contained in the set of connected forest objects is unspecified, the contents of the forest object are indicated by showing the first and last elements of the set, suitably indexed, with ellipses indicating the intervening forest objects in the set and ellipses indicating the arrows that connect these intervening forest objects to the containing forest object.

Referring to FIG. 3B, the self-embed operation on a forest object labeled Fx is defined as: (1) relabel Fx as Fx.0, (2)

construct an empty forest object labeled Fx, and (3) add Fx.0 to Fx. FIG. 3B presents a schematic of the self-embed operation showing the initial state (3B.0), the state after step 1 (3B.1), the state after step 2 (3B.2), and the state after step 3 (3B.3), which is the final state.

The N-fold replication operation on a forest object labeled Fx is defined as: (1) perform the self-embed operation on Fx; (2) construct N-1 copies of Fx.0, labeled Fx.1 through Fx.(N-1); and (3) add Fx.1 through Fx.(N-1) to Fx. FIG. 3C presents a schematic of the N-fold replication operation showing the initial state (3C.0), the state after step 1 (3C.1), the state after step 2 (3C.2), and the state after step 3 (3C.3), which is the final state.

Two other operations on forest objects are defined as follows:

(1) The vector-update operation for a forest object Fx and a vector V of edgenodes is only possible if Fx is of cardinality N (i.e., it contains N embedded forests, labeled Fx.0 through Fx. (N-1)) and vector V is of length N. When this is true, the operation proceeds by creating a treenode Ti corresponding to the $i^{th}$ element of vector V and adding Ti to forest Fi (the $i^{th}$ forest object in Fx) under its active node, thus making it the new active node of Fx.i.

(2) The scalar-update operation for a forest object Fx and a treenode T is defined as: (1) construct N copies of T, where N is the cardinality of Fx, storing the copies in a set {T1, . . . , TN}, and (2) for each forest object Fx.i in Fx, add the treenode Ti to its active node. Note that adding a treenode to the active node of a forest that itself contains one or more forests has the effect of recursively adding this treenode to the active node of each of the embedded forests.

Figure 9A:
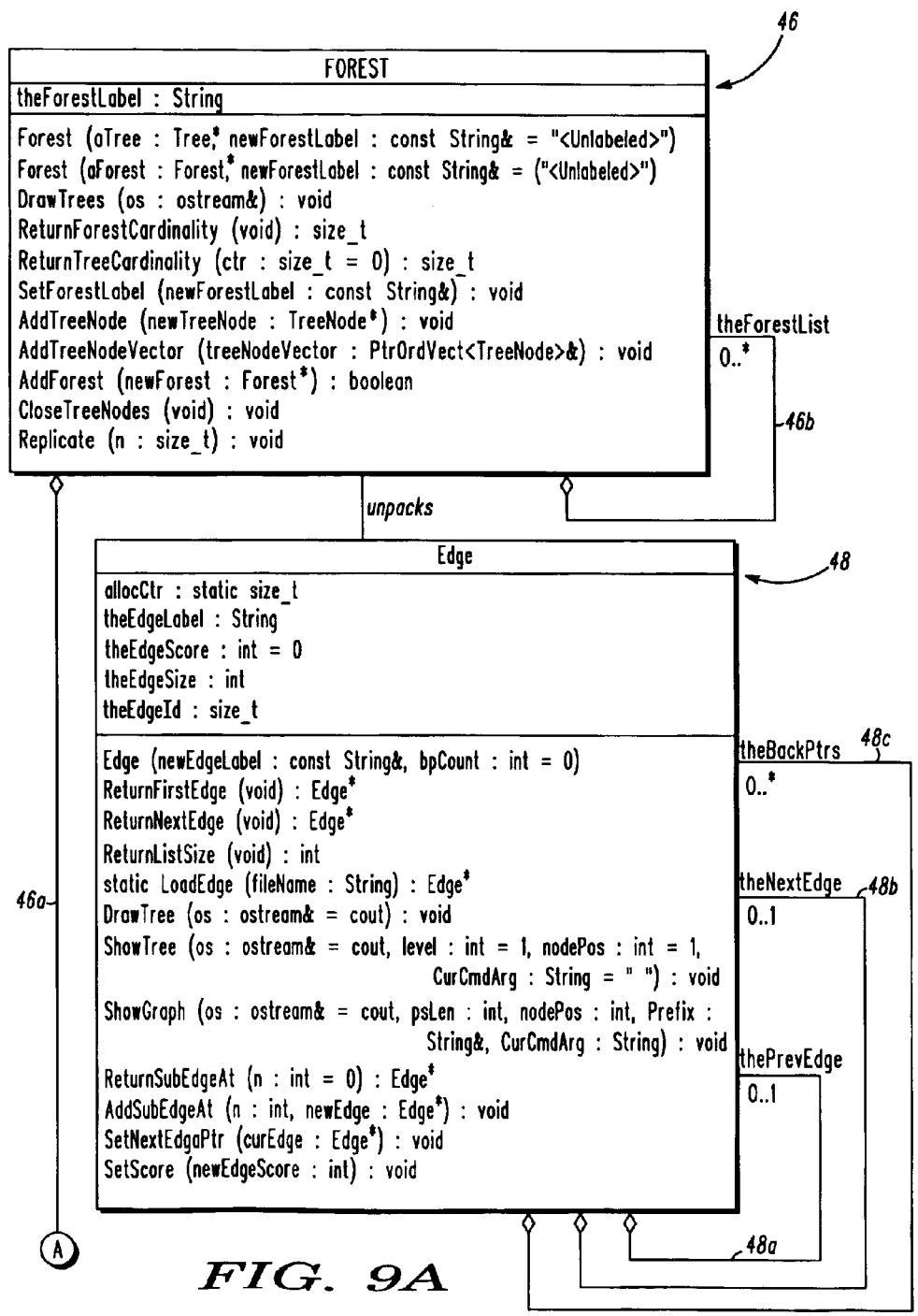
FIG. 9A is a UML diagram of a preferred embodiment for the Forest and Edge classes.
Figure 9B:
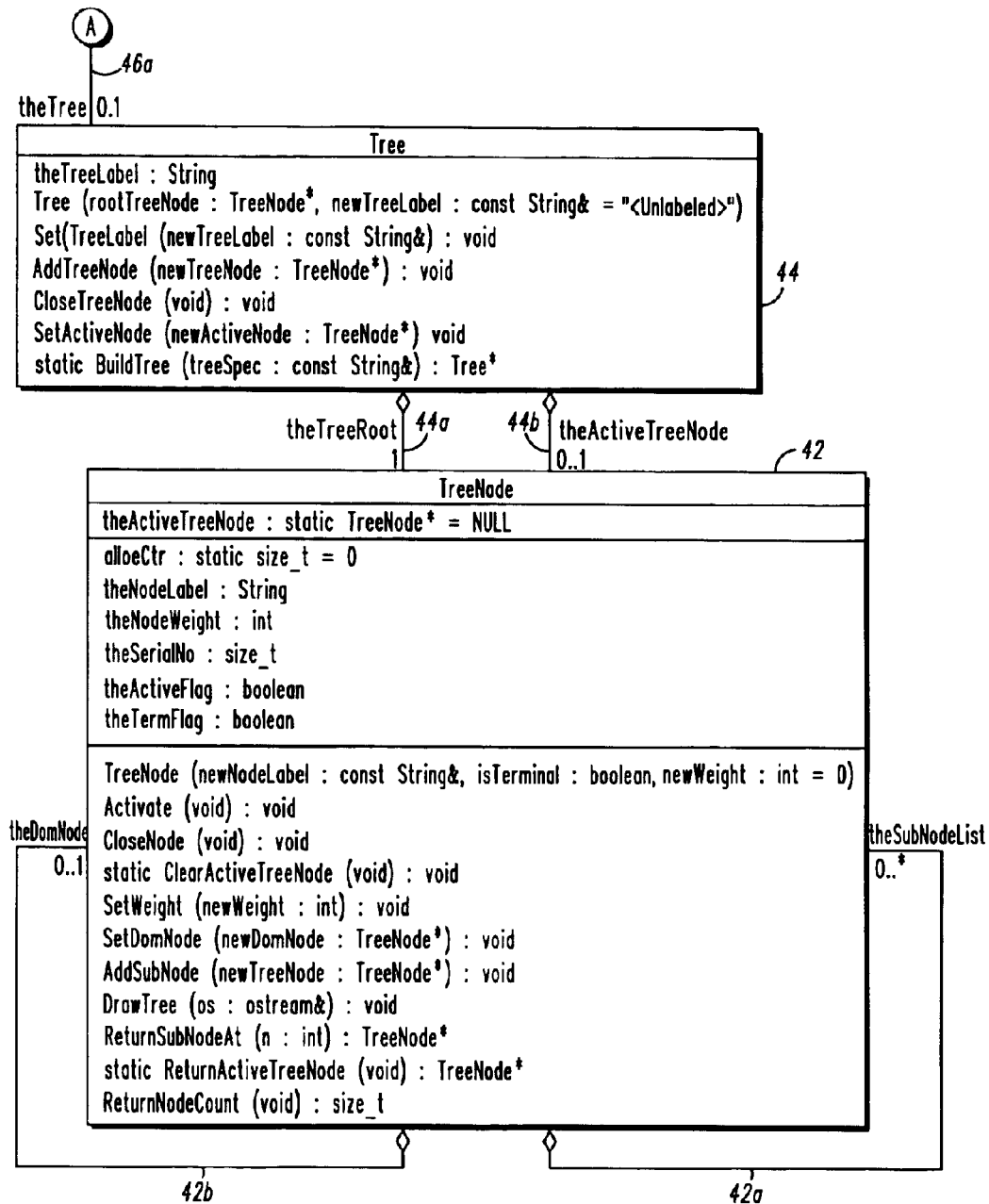
FIG. 9B is a UML diagram of a preferred embodiment for the Tree and TreeNode classes.

Referring to FIG. 9, the above algorithm can be implemented by use of the following four classes:

1. The Treenode class 42 encodes a single node in a parse tree and can directly dominate an unspecified number of other Treenodes 42. Each Treenode 42 contains an unbounded collection of Treenode pointers which reference its directly subordinate nodes 42*a* and also includes a pointer to the Treenode 42 (if any) that directly dominates it 42*b*. Additionally, because of the synchronous construction behavior required by the Tree class, each Treenode 42 needs to "know" whether or not it is still under construction (i.e., whether it can still receive subordinate nodes). This requires special behavior by the Treenode copy constructor (which recursively performs a deep copy of all Treenodes dominated by the Treenode being copied), in order to ensure that this information is properly identified and transmitted.

2. The Tree class 44 encodes a single parse tree (which is either complete or "partial," i.e., under construction), consisting of one or more Treenode objects 42. Pointers to two specific Treenode objects can be requested from a Tree object, its root (Tree root pointer 44*a*), and its "active node" (Active Treenode pointer 44*b*). The latter is NULL if the tree 44 is complete. If the tree 44 is partial, then the active node is the one that is modified during the course of tree completion. This encodes the restriction that a Tree object can only grow at one point during its construction (though, of course, this point will move around within the Tree). Because the Treenode copy constructor performs a recursive deep copy, the Tree copy constructor is accordingly simplified (i.e., to copying the root node and then ensuring that the active node information is properly transmitted).

3. The Forest class 46 contains either: (1) a single Tree object 46*a* (which may be either partial or complete); or (2) an ordered set of one or more Forest objects 46*b*. In the latter case, the Forest objects 46*b* will be either all partial or all complete, thus a Forest object 46*b* itself may be also said to be either partial or complete. If the Forest 46 is partial, then it has an "active nodeset," which consists of the set of all active nodes of its constituent objects (i.e., either Trees or Forests). This nodeset may be updated by either: (1) adding a single Treenode to it, with the result that the Treenode is cloned and added to all of the objects in the Forest (at their active nodes or nodesets, which are updated accordingly); or (2) adding a vector of Treenodes which is the same length as the number of Forests in the Forest (with the result that the vector elements are added in pairwise fashion to the active nodes of the Forests). This permits the simultaneous "growing" of the Tree objects in the Forest. Execution of the node-closure operation on the active nodeset results in the new active node for each Tree in the Forest being determined by that Tree's geometry, with the Forest's nodeset updated accordingly. Finally, an n-fold replication operation may be applied to a given Forest object, resulting in a new Forest object that contains n identical copies of the original Forest object.

4. The Edge class 48 is the class used by the parser 14 to encode edge information during the course of the parse. The Edge class is composed of: (1) a proper subset of the data and functions of the Edge class currently used by the parser 14, and (2) the static "LoadEdge" function used to interpret the commands of the declarative packed-edge specification language. Every Edge 48 contains zero or one Previous Edge pointers 48*a*, zero or one Next Edge pointers 48*b*, and zero or more back pointers 48*c*. As shown in the UML diagram of FIG. 9, all interaction with this class is handled through the Forest class 46; thus the integration of the functionality described above into the parser 14 is straightforwardly localized to a single interface. Edges and Treenodes may be implemented as separate classes. Alternatively, they may be linked by inheritance in order to streamline the implementation of the parser.

Figure 6:
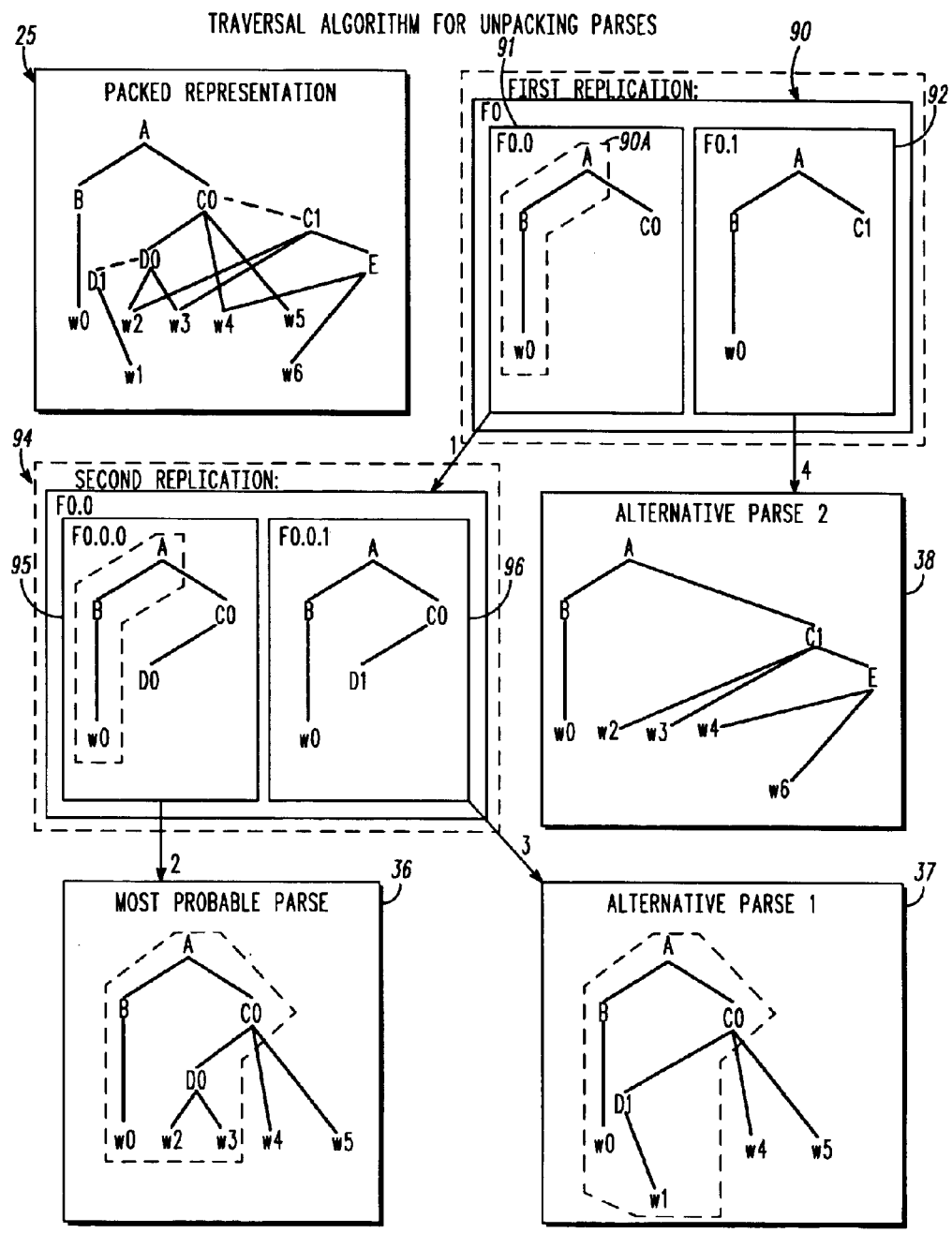
FIG. 6 is a schematic representation of the unpacking process of the packed forest of FIG. 4.

As discussed above, when the parser 14 is run in multiple-parse mode, the resulting parses are generated and stored in a packed representation 25, a simplified example of which is shown in the upper left-hand corner of FIG. 6. The most probable parse 36 for a given sentence is obtained from the packed representation 25 by choosing the first element 32*a* from each substitution list 32 during a traversal of the packed representation 25. As also discussed above, an ordered set of parses may therefore be obtained from the packed representation 25 by generalizing the traversal algorithm to operate on "forests" of trees as follows:

During the traversal of the packed representation:

1. Each time the first edgenode in a substitution list 32 containing N elements, N>1, is encountered, an N-fold replication of the current forest Fx is performed.
2. A vector update of Fx is then performed using the substitution list (which contains N elements).
3. The current forest pointer is set to point at the forest Fx.0 and the current node pointer is set to point at the next edgenode in the packed representation.

The traversal then continues through each forest Fx.i in Fx according to the order of elements in the substitution list 32 (thus completing the processing of all of the edgenodes below a particular edgenode in the list before the processing of the next edgenode in the list is begun).

The traversal of the packed representation therefore involves the updating of two pointers: (1) the current node pointer, which references the edgenode that is currently being processed in the packed representation, and (2) the current forest pointer, which references the forest object currently being modified. As discussed above, a forest object is modified by either adding a given treenode to the "active node" of the forest object or by applying the "node closure" operation to the forest's active node (which, depending on the internal structure of the forest, will result in either a new active node being activated in the forest or in the forest becoming complete; i.e., containing no active node). In the initial state of the unpacking algorithm, the current node pointer points at the root edgenode in the packed representation and the current forest pointer points at an empty forest object labeled F0.

Referring to FIGS. 2 and 3A an example of a preferred embodiment of the unpacking process is illustrated. From the packed representation input (block 49) the root edgenode 30A (FIG. 4) of the packed representation 25 is obtained and becomes the current edgenode (block 50). An empty forest object labeled F0 is created and becomes the current forest (block 51). Because the current edgenode 30A is the first edgenode in the substitution list 32A (block 52), N is set to the length of the substitution list for the current edgenode (block 53). For edgenode 30A, the length of the substitution list 32A is equal to 1. Because N is not greater than 1 (block 54) a scalar update of the current forest F0 is performed with the current edgenode (block 55), resulting in a treenode labeled A being added to the (empty) current forest F0, where it becomes the active node.

The next edgenode is now obtained (block 59) starting at block 64 as shown in FIG. 3A. Because the current edgenode 30A has at least one child (block 66), the next edgenode is set to the leftmost child of the current edgenode (block 68), that is, to edgenode 30B. Because the next edgenode is not NULL (block 60), the current edgenode is set to the next edgenode 30B (block 61).

Next, because the current edgenode 30B is the first edgenode in its substitution list 32B (block 52), N is set to the length of the substitution list for the current edgenode (block 53). For edgenode 30B, the length of the substitution list 32B is equal to 1. Because N is not greater than 1 (block 54) a scalar update of the current forest F0 is performed with the current edgenode (block 55), resulting in a treenode labeled B being added to the current forest F0, under its active node (the treenode labeled A). Because the edgenode 30B is a nonterminal node, its corresponding treenode labeled B is also a nonterminal node, thus the nonterminal treenode labeled B becomes the new active node in the current forest F0.

The next edgenode is now obtained (block 59) as shown in FIG. 3A. Because the current edgenode 30B has at least one child (block 66), the next edgenode is set to the leftmost child of the current edgenode (block 68), that is, to edgenode 30W0. Because the next edgenode is not NULL (block 60), the current edgenode is set to the next edgenode 30W0 (block 61).

Next, because the current edgenode 30W0 is the first edgenode in its substitution list 32W0 (block 52), N is set to the length of the substitution list for the current edgenode (block 53). For edgenode 30W0, the length of the substitution list 32W0 is equal to 1. Because N is not greater than 1 (block 54) a scalar update of the current forest F0 is performed with the current edgenode (block 55), resulting in a treenode labeled w0 being added to the current forest F0, under its active node (the treenode labeled B). Because the edgenode 30W0 is a terminal node, its corresponding treenode labeled w0 is also a terminal node, thus the treenode labeled B remains the active node in the current forest F0.

The next edgenode is now obtained (block 59) as shown in FIG. 3A. Because the current edgenode 30W0 does not have at least one child (block 66), it is tested to see if it is the last edgenode in the substitution list 32W0 (block 70). Because it is the only edgenode in the substitution list 32W0, it is necessarily the last one, so it is tested to see if it has a sibling to its immediate right (block 76). Because it does not have a sibling to its immediate right, the node closure operation is applied to the current forest F0. The active node of the current forest F0 is the treenode labeled B. Thus the application of the node closure operation results in the treenode labeled A (which is the parent node of the treenode labeled B) becoming the new active node of the current forest F0 (block 77). The current edgenode is then tested to see if it has a parent (block 82). Because the current edgenode 30W0 has a parent (edgenode 30B), the current edgenode becomes edgenode 30B (block 86). Because the current forest is F0, it remains unchanged (block 87).

The new current edgenode 30B is now tested to see if it is the last edgenode in the substitution list 32B (block 70). Because it is the only edgenode in the substitution list, it is necessarily the last one, so it is tested to see if it has a sibling to its immediate right (block 76). Because it has a sibling to its immediate right, the next edgenode is set to this sibling, that is, to edgenode 30C0 (block 78). Because the next edgenode is not NULL (block 60), the current edgenode is set to the next edgenode 30C0 (block 61).

Next, because the current edgenode 30C0 is the first edgenode in its substitution list 32C (block 52), N is set to the length of the substitution list for the current edgenode (block 53). For edgenode 30C0, the length of the substitution list 32C is equal to 2. Because N is greater than 1 (block 54) an N-fold replication of the current forest F0 is performed (with N equal to 2). Referring to FIG. 6, this replication results in the partial tree 90A in the current forest F0 being copied into two new forests 91 and 92, respectively labeled F0.0 and F0.1, which become the new contents of the current forest F0. Next, a vector update of the current forest F0 is performed with the substitution list 32C of the current edgenode 30C0. This results in a treenode labeled C0 (from the first element of the substitution list 32C) being added under the active node (the treenode labeled A) of forest F0.0 (thus becoming the new active node of this forest), and a treenode labeled C1 (from the second element of the substitution list 32C) being added under the active node (the treenode labeled A) of forest F0.1 (thus becoming the new active node of this forest), as shown in the box labeled "First Replication" in the upper right-hand corner of FIG. 6. The current forest is now set to the first forest in F0 (90), that is, to forest F0.0 (91) (block 58).

The next edgenode is now obtained (block 59) as shown in FIG. 3A. Because the current edgenode 30C has at least one child (block 66), the next edgenode is set to the leftmost child of the current edgenode (block 68), that is, to edgenode 30D0. Because the next edgenode is not NULL (block 60), the current edgenode is set to the next edgenode 30D0 (block 61).

Next, because the current edgenode 30D0 is the first edgenode in its substitution list 32D (block 52), N is set to the length of the substitution list for the current edgenode (block 53). For edgenode 30D0, the length of the substitution list 32D is equal to 2. Because N is greater than 1 (block 54) an N-fold replication (94) of the current forest F0.0 is performed (with N equal to 2). This replication results in the partial tree in the current forest F0.0 (91) being copied into two new forests, respectively labeled F0.0.0 (95) and F0.0.1 (96), which become the new contents of the current forest F0.0 (91). Next, a vector update of the current forest F0.0 (91) is performed with the substitution list 32D of the current edgenode 30D0. This results in a treenode labeled D0 (from the first element of the substitution list 32D) being added under the active node (the treenode labeled C0) of forest F0.0.0 (thus becoming the new active node of this forest) and a treenode labeled D1 (from the second element of the substitution list 32D) being added under the active node (the treenode labeled C0) of forest F0.0.1 (thus becoming the new active node of this forest), as shown in the box 94 labeled "Second Replication" in the left central portion of FIG. 6. The current forest is now set to the first forest in F0.0, that is, to forest F0.0.0 (95) (block 58).

The next edgenode is now obtained (block 59) as shown in FIG. 3A. Because the current edgenode 30D0 has at least one child (block 66), the next edgenode is set to the leftmost child of the current edgenode (block 68), that is, to edgenode 30W2. Because the next edgenode is not NULL (block 60), the current edgenode is set to the next edgenode 30W2 (block 61).

Next, because the current edgenode 30W2 is the first edgenode in its substitution list 32W2 (block 52), N is set to the length of the substitution list for the current edgenode (block 53). For edgenode 30W2, the length of the substitution list 32W2 is equal to 1. Because N is not greater than 1 (block 54) a scalar update of the current forest F0.0.0 is performed with the current edgenode (block 55), resulting in a treenode labeled w2 being added to the current forest F0.0.0, under its active node (the treenode labeled D0). Because the edgenode 30W2 is a terminal node, its corresponding treenode labeled w2 is also a terminal node, thus the treenode labeled D0 remains the active node in the current forest F0.0.0 (95).

The next edgenode is now obtained (block 59) as shown in FIG. 3A. Because the current edgenode 30W2 does not have at least one child (block 66), it is tested to see if it is the last edgenode in the substitution list 32W2 (block 70). Because it is the only edgenode in the substitution list 32W2, it is necessarily the last one, so it is tested to see if it has a sibling to its immediate right (block 76). Because it has a sibling to its immediate right, the next edgenode is set to this sibling, that is, to edgenode 30W3 (block 78). Because the next edgenode is not NULL (block 60), the current edgenode is set to the next edgenode 30W3 (block 61).

Next, because the current edgenode 30W3 is the first edgenode in its substitution list 32W3 (block 52), N is set to the length of the substitution list for the current edgenode (block 53). For edgenode 30W3, the length of the substitution list 32W3 is equal to 1. Because N is not greater than 1 (block 54) a scalar update of the current forest F0.0.0 (95) is performed with the current edgenode (block 55), resulting in a treenode labeled w3 being added to the current forest F0.0.0 under its active node (the treenode labeled D0). Because the edgenode 30W3 is a terminal node, its corresponding treenode labeled w3 is also a terminal node, thus the treenode labeled D0 remains the active node in the current forest F0.0.0.

The next edgenode is now obtained (block 59) as shown in FIG. 3A. Because the current edgenode 30W3 does not have at least one child (block 66), it is tested to see if it is the last edgenode in the substitution list 32W3 (block 70). Because it is the only edgenode in the substitution list 32W3, it is necessarily the last one, so it is tested to see if it has a sibling to its immediate right (block 76). Because it does not have a sibling to its immediate right, the node closure operation is applied to the current forest F0.0.0. The active node of the current forest F0.0.0 is the treenode labeled D0. Thus the application of the node closure operation results in the treenode labeled C0 (which is the parent node of the treenode labeled D0) becoming the new active node of the current forest F0.0.0 (block 77). The current edgenode is then tested to see if it has a parent (block 82). Because the current edgenode 30W3 has a parent (edgenode 30D0), the current edgenode becomes edgenode 30D0 (block 86). Because the current forest is F0.0.0, not F0 (block 87), it is changed to the forest of the parent of the current edgenode (block 88), that is, to F0.0.

The new current edgenode 30D0 is now tested to see if it is the last edgenode in the substitution list 32D (block 70). Because it is not the last edgenode in the substitution list 32D, the next edgenode is set to the next edgenode in the substitution list 32D (block 72), that is, to edgenode 30D1. The current forest is now set to the forest of edgenode 30D1, that is, to the forest labeled F0.0.1 (block 74). Because the next edgenode is not NULL (block 60), the current edgenode is set to the next edgenode 30D1 (block 61).

Because the current edgenode 30D1 is not the first edgenode in the substitution list 32D (block 52), the next edgenode is now obtained (block 59) as shown in FIG. 3A. Because the current edgenode 30D1 has at least one child (block 66), the next edgenode is set to the leftmost child of the current edgenode (block 68), that is, to edgenode 30W1. Because the next edgenode is not NULL (block 60), the current edgenode is set to the next edgenode 30W1 (block 61).

Next, because the current edgenode 30W1 is the first edgenode in its substitution list 32W1 (block 52), N is set to the length of the substitution list for the current edgenode (block 53). For edgenode 30W1, the length of the substitution list 32W1 is equal to 1. Because N is not greater than 1 (block 54) a scalar update of the current forest F0.0.1 is performed with the current edgenode (block 55), resulting in a treenode labeled w1 being added to the current forest F0.0.1, under its active node (the treenode labeled D1). Because the edgenode 30W1 is a terminal node, its corresponding treenode labeled w1 is also a terminal node, thus the treenode labeled D1 remains the active node in the current forest F0.0.1.

The next edgenode is now obtained (block 59) as shown in FIG. 3A. Because the current edgenode 30W1 does not have at least one child (block 66), it is tested to see if it is the last edgenode in the substitution list 32W1 (block 70). Because it is the only edgenode in the substitution list 32W1, it is necessarily the last one, so it is tested to see if it has a sibling to its immediate right (block 76). Because it does not have a sibling to its immediate right, the node closure operation is applied to the current forest F0.0.1. The active node of the current forest F0.0.1 is the treenode labeled D1. Thus the application of the node closure operation results in the treenode labeled C0 (which is the parent node of the treenode labeled D1) becoming the new active node of the current forest F0.0.1 (block 77). The current edgenode is then tested to see if it has a parent (block 82). Because the current edgenode 30W1 has a parent (edgenode 30D1), the current edgenode becomes edgenode 30D1 (block 86). Because the current forest is F0.0.1, not F0 (block 87), it is changed to the forest of the parent of the current edgenode (block 88), that is, to F0.0.

The new current edgenode 30D1 is now tested to see if it is the last edgenode in the substitution list 32D (block 70).

Because it is the last edgenode in the substitution list 32D, it is tested to see if it has a sibling to its immediate right (block 76). Because it has a sibling to its immediate right, the next edgenode is set to this sibling, that is, to edgenode 30W4 (block 78). Because the next edgenode is not NULL (block 60), the current edgenode is set to the next edgenode 30W4 (block 61).

Next, because the current edgenode 30W4 is the first edgenode in its substitution list 32W4 (block 52), N is set to the length of the substitution list for the current edgenode (block 53). For edgenode 30W4, the length of the substitution list 32W4 is equal to 1. Because N is not greater than 1 (block 54) a scalar update of the current forest F0.0 is performed with the current edgenode (block 55), resulting in a treenode labeled w4 being added to the current forest F0.0. Because the current forest F0.0 contains the two forests F0.0.0 and F0.0.1, each of these forests is updated at its active node with a copy of the treenode labeled w4 (in both of these forests, the current active node is the treenode labeled C0). Because the edgenode 30W4 is a terminal node, its corresponding treenode labeled w4 is also a terminal node, thus the active nodes of the forests in the current forest F0.0 are not changed.

The next edgenode is now obtained (block 59) as shown in FIG. 3A. Because the current edgenode 30W4 does not have at least one child (block 66), it is tested to see if it is the last edgenode in the substitution list 32W4 (block 70). Because it is the only edgenode in the substitution list 32W4, it is necessarily the last one, so it is tested to see if it has a sibling to its immediate right (block 76). Because it has a sibling to its immediate right, the next edgenode is set to this sibling, that is, to edgenode 30W5 (block 78). Because the next edgenode is not NULL (block 60), the current edgenode is set to the next edgenode 30W5 (block 61).

Next, because the current edgenode 30W5 is the first edgenode in its substitution list 32W5 (block 52), N is set to the length of the substitution list for the current edgenode (block 53). For edgenode 30W5, the length of the substitution list 32W5 is equal to 1. Because N is not greater than 1 (block 54) a scalar update of the current forest F0.0 is performed with the current edgenode (block 55), resulting in a treenode labeled w5 being added to the current forest F0.0. Because the current forest F0.0 contains the two forests F0.0.0 and F0.0.1, each of these forests is updated at its active node with a copy of the treenode labeled w5 (in both of these forests, the current active node is the treenode labeled C0). Because the edgenode 30W5 is a terminal node, its corresponding treenode labeled w5 is also a terminal node, thus the active nodes of the forests in the current forest F0.0 are not changed.

The next edgenode is now obtained (block 59) as shown in FIG. 3A. Because the current edgenode 30W5 does not have at least one child (block 66), it is tested to see if it is the last edgenode in the substitution list 32W5 (block 70). Because it is the only edgenode in the substitution list 32W5, it is necessarily the last one, so it is tested to see if it has a sibling to its immediate right (block 76). Because it does not have a sibling to its immediate right, the node closure operation is applied to the current forest F0.0 (block 77). Because the current forest F0.0 contains the two forests F0.0.0 and F0.0.1, the application of the node closure operation to it results in the node closure operation being applied to each of these contained forests. The active node of the forest F0.0.0 is the treenode labeled C0. Thus the application of the node closure operation to the forest F0.0.0 results in the treenode labeled A (which is the parent node of the treenode labeled C0) becoming the new active node of the forest F0.0.0. Similarly, the active node of the forest F0.0.1 is the treenode labeled C0. Thus the application of the node closure operation to the forest F0.0.1 results in the treenode labeled A (which is the parent node of the treenode labeled C0) becoming the new active node of the forest F0.0.1.

Because it does not have a sibling to its immediate right, the node closure operation is applied to the current forest F0.0, resulting in the parent treenode (labeled C0) of the treenode labeled w3 becoming the new active node of the current forest F0.0 (block 77). The current edgenode is then tested to see if it has a parent (block 82). Because the current edgenode 30W5 has a parent (edgenode 30C0), the current edgenode becomes edgenode 30C0 (block 86). Because the current forest is F0.0, not F0 (block 87), it is changed to the forest of the parent of the current edgenode (block 88), that is, to F0.

The new current edgenode 30C0 is now tested to see if it is the last edgenode in the substitution list 32C (block 70). Because it is not the last edgenode in the substitution list 32C, the next edgenode is set to the next edgenode in the substitution list 32C (block 72), that is, to edgenode 30C1. The current forest is now set to the forest of edgenode 30C1, that is, to the forest labeled F0.1 (block 74). Because the next edgenode is not NULL (block 60), the current edgenode is set to the next edgenode 30C1 (block 61).

Because the current edgenode is not the first edgenode in the substitution list (block 52), the next edgenode is now obtained (block 59) as shown in FIG. 3A. Because the current edgenode 30C1 has at least one child (block 66), the next edgenode is set to the leftmost child of the current edgenode (block 68), that is, to edgenode 30W2. Because the next edgenode is not NULL (block 60), the current edgenode is set to the next edgenode 30W2 (block 61).

Next, because the current edgenode 30W2 is the first edgenode in its substitution list 32W2 (block 52), N is set to the length of the substitution list for the current edgenode (block 53). For edgenode 30W2, the length of the substitution list 32W2 is equal to 1. Because N is not greater than 1 (block 54) a scalar update of the current forest F0.1 is performed with the current edgenode (block 55), resulting in a treenode labeled w2 being added to the current forest F0.1, under its active node (the treenode labeled C1). Because the edgenode 30W2 is a terminal node, its corresponding treenode labeled w2 is also a terminal node, thus the treenode labeled C1 remains the active node in the current forest F0.1.

The next edgenode is now obtained (block 59) as shown in FIG. 3A. Because the current edgenode 30W2 does not have at least one child (block 66), it is tested to see if it is the last edgenode in the substitution list 32W2 (block 70). Because it is the only edgenode in the substitution list 32W2, it is necessarily the last one, so it is tested to see if it has a sibling to its immediate right (block 76). Because it has a sibling to its immediate right, the next edgenode is set to this sibling, that is, to edgenode 30W3 (block 78). Because the next edgenode is not NULL (block 60), the current edgenode is set to the next edgenode 30W3 (block 61).

Next, because the current edgenode 30W3 is the first edgenode in its substitution list 32W3 (block 52), N is set to the length of the substitution list for the current edgenode (block 53). For edgenode 30W3, the length of the substitution list 32W3 is equal to 1. Because N is not greater than 1 (block 54) a scalar update of the current forest F0.1 is performed with the current edgenode (block 55), resulting in a treenode labeled w3 being added to the current forest F0.1, under its active node (the treenode labeled C1). Because the edgenode 30W3 is a terminal node, its corresponding treenode labeled w3 is also a terminal node, thus the treenode labeled C1 remains the active node in the current forest F0.1.

The next edgenode is now obtained (block 59) as shown in FIG. 3A. Because the current edgenode 30W3 does not have at least one child (block 66), it is tested to see if it is the last edgenode in the substitution list 0.32W3 (block 70). Because it is the only edgenode in the substitution list 32W3, it is necessarily the last one, so it is tested to see if it has a sibling to its immediate right (block 76). Because it has a sibling to its immediate right, the next edgenode is set to this sibling, that is, to edgenode 30E (block 78). Because the next edgenode is not NULL (block 60), the current edgenode is set to the next edgenode 30E (block 61).

Next, because the current edgenode 30E is the first edgenode in its substitution list 32E (block 52), N is set to the length of the substitution list for the current edgenode (block 53). For edgenode 30E, the length of the substitution list 32E is equal to 1. Because N is not greater than 1 (block 54) a scalar update of the current forest F0.1 is performed with the current edgenode (block 55), resulting in a treenode labeled E being added to the current forest F0.1, under its active node (the treenode labeled C1). Because the edgenode 30E is a nonterminal node, its corresponding treenode labeled E is also a nonterminal node, thus the nonterminal treenode labeled E becomes the new active node in the current forest F0.1.

The next edgenode is then obtained (block 59) as shown in FIG. 3A. Because the current edgenode 30E has at least one child (block 66), the next edgenode is set to the leftmost child of the current edgenode (block 68), that is, to edgenode 30W4. Because the next edgenode is not NULL (block 60), the current edgenode is set to the next edgenode 30W4 (block 61).

Next, because the current edgenode 30W4 is the first edgenode in its substitution list 32W4 (block 52), N is set to the length of the substitution list for the current edgenode (block 53). For edgenode 30W4, the length of the substitution list 32W4 is equal to 1. Because N is not greater than 1 (block 54) a scalar update of the current forest F0.1 is performed with the current edgenode (block 55), resulting in a treenode labeled w4 being added to the current forest F0.1, under its active node (the treenode labeled E). Because the edgenode 30W4 is a terminal node, its corresponding treenode labeled w4 is also a terminal node, thus the treenode labeled E remains the active node in the current forest F0.1.

The next edgenode is now obtained (block 59) as shown in FIG. 3A. Because the current edgenode 30W4 does not have at least one child (block 66), it is tested to see if it is the last edgenode in the substitution list 32W4 (block 70). Because it is the only edgenode in the substitution list 32W4, it is necessarily the last one, so it is tested to see if it has a sibling to its, immediate right (block 76). Because it has a sibling to its immediate right, the next edgenode is set to this sibling, that is, to edgenode 30W6 (block 78). Because the next edgenode is not NULL (block 60), the current edgenode is set to the next edgenode 30W6 (block 61).

Next, because the current edgenode 30W6 is the first edgenode in its substitution list 32W6 (block 52), N is set to the length of the substitution list for the current edgenode (block 53). For edgenode 30W6, the length of the substitution list 32W6 is equal to 1. Because N is not greater than 1 (block 54) a scalar update of the current forest F0.1 is performed with the current edgenode (block 55), resulting in a treenode labeled w6 being added to the current forest F0.1, under its active node (the treenode labeled E). Because the edgenode 30W6 is a terminal node, its corresponding treenode labeled w6 is also a terminal node, thus the treenode labeled E remains the active node in the current forest F0.1.

The next edgenode is now obtained (block 59) as shown in FIG. 3A. Because the current edgenode 30W6 does not have at least one child (block 66), it is tested to see if it is the last edgenode in the substitution list 32W6 (block 70). Because it is the only edgenode in the substitution list 32W6, it is necessarily the last one, so it is tested to see if it has a sibling to its immediate right (block 76). Because it does not have a sibling to its immediate right, the node closure operation is applied to the current forest F0.1, resulting in the parent treenode of the treenode labeled E (i.e., the treenode labeled C1) becoming the new active node of the current forest F0.1 (block 77). The current edgenode is then tested to see if it has a parent (block 82). Because the current edgenode 30W6 has a parent (edgenode 30E), the current edgenode becomes edgenode 30E (block 86). Because the current forest is F0.1, not F0 (block 87), it is changed to the forest of the parent of the current edgenode (block 88), that is, to F0.1 (thus remaining unchanged).

The new current edgenode 30E is now tested to see if it is the last edgenode in the substitution list 32E (block 70). Because it is the only edgenode in the substitution list 32E, it is necessarily the last one, so it is tested to see if it has a sibling to its immediate right (block 76). Because it does not have a sibling to its immediate right, the node closure operation is applied to the current forest F0.1, resulting in the parent treenode of the treenode labeled C1 (i.e., the treenode labeled A) becoming the new active node of the current forest F0.1 (block 77). The current edgenode is then tested to see if it has a parent (block 82). Because the current edgenode 30E has a parent (edgenode 30C1), the current edgenode becomes edgenode 30C1 (block 86). Because the current forest is F0.1, not F0 (block 87), it is changed to the forest of the parent of the current edgenode (block 88), that is, to F0.

The new current edgenode 30C1 is now tested to see if it is the last edgenode in the substitution list 32C (block 70). Because it is the last edgenode in the substitution list 32C, it is tested to see if it has a sibling to its immediate right (block 76). Because it does not have a sibling to its immediate right, the node closure operation is applied to the current forest F0. Because the forest F0 contains the forests F0.1 and F0.0 (and the forest F0.0 itself contains the forests F0.0.0 and F0.0.1), the node closure operation is applied to each of these contained forests. Since the active node in forest F0.1 is the treenode labeled C1, it is closed and the new active node in this forest becomes the treenode labeled A. Similarly, since the active node in forest F0.0.0 is the treenode labeled C0, it is closed and the new active node in this forest becomes the treenode labeled A. Finally, since the active node in forest F0.0.1 is the treenode labeled C0, it is closed and the new active node in this forest becomes the treenode labeled A. The current edgenode is then tested to see if it has a parent (block 82). Because the current edgenode 30C1 has a parent (edgenode 30A), the current edgenode becomes edgenode 30A (block 86). Because the current forest is F0 (block 87) it remains unchanged.

The new current edgenode 30A is now tested to see if it is the last edgenode in the substitution list 32A (block 70). Because it is the only edgenode in the substitution list 32A, it is necessarily the last one, so it is tested to see if it has a sibling to its immediate right (block 76). Because it does not have a sibling to its immediate right, the node closure operation is applied to the current forest F0. Because the forest F0 contains the forests F0.1 and F0.0 (and the forest F0.0 itself contains the forests F0.0.0 and F0.0.1), the node closure operation is applied to each of these contained forests. Since the active node in each of these forests is the treenode labeled A (which is the root treenode of each forest), this results in each forest being completed. Because the current edgenode 30A is the root edgenode of the packed representation, it does not have a parent, so the next edgenode is set to NULL (block 84).

Because the next edgenode is NULL (block 60), the unpacking module is finished processing (block 62).

Figure 7:
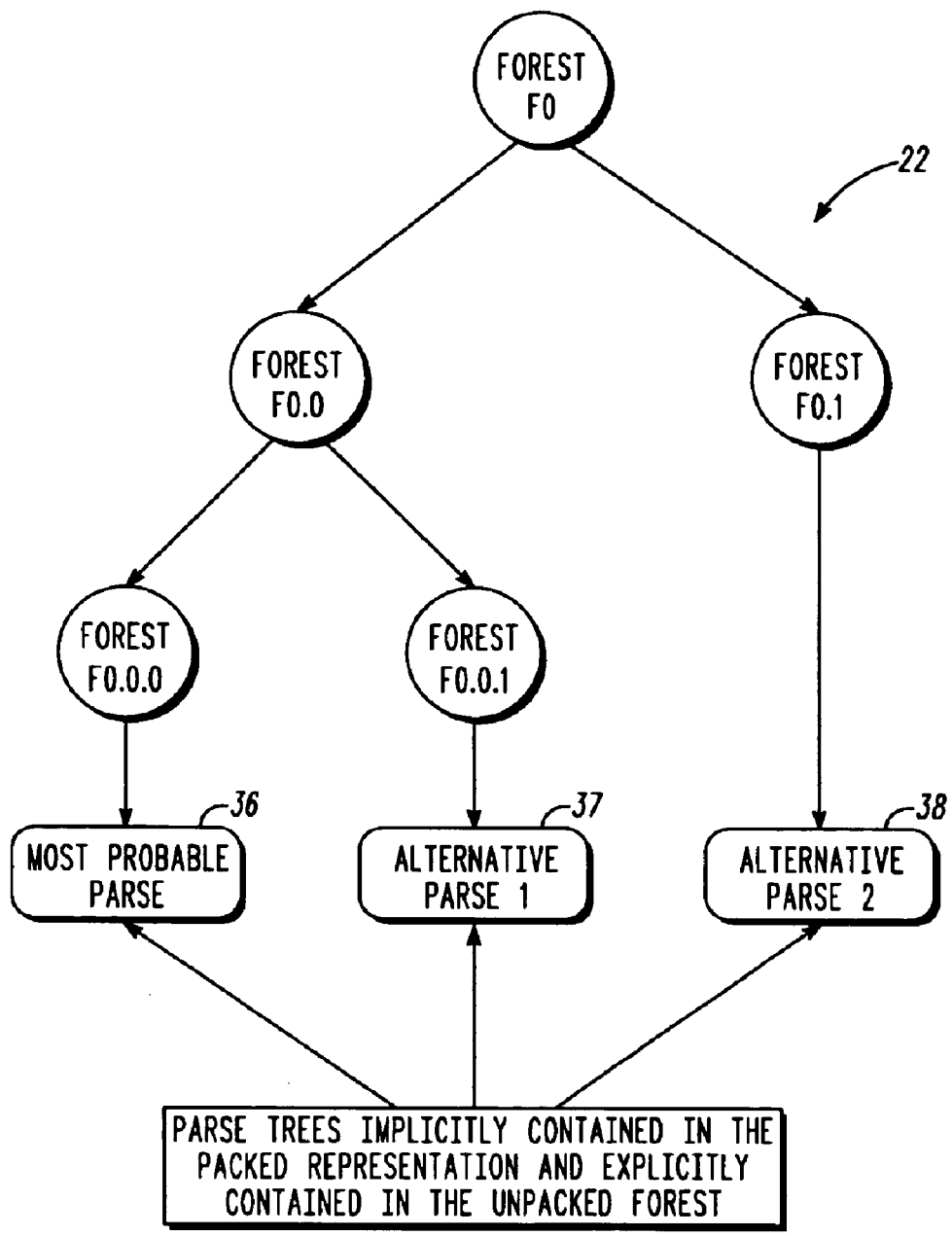
FIG. 7 is a schematic representation of an unpacked forest resulting from unpacking the packed forest of FIG. 4.

Referring to FIG. 7, the unpacked forest 110 contains each of the three parses, including the most probable parse (36), alternative parse 1 (37) and alternative parse 2 (38). The parse trees in the unpacked forest object 22 are readable by conventional semantic interpreters.

As discussed above, although the most probable parse is guaranteed to be the first one returned by this algorithm, the relative order of the remaining parses must be determined by reference to their relative weights. This is accomplished by merging the parse trees contained in a particular Forest object into a frequency-sorted list that can be returned by a Forest-class accessor. This list is a static data member of the Forest class, into which a pointer to each Tree is inserted upon Tree completion (thus obviating the need for an additional traversal of the Forest to obtain these pointers).

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of decoding a packed representation of multiple parses comprising the steps of:
   providing a packed representation including at least one edgenode, each edgenode including a substitution list;
   creating a current forest object;
   replicating the current forest object for each edgenode having a substitution list containing greater than one edgenode; and
   traversing each edgenode of the packed representation.

2. The method of claim 1 further comprising the step of performing a scalar update of the current forest object for each edgenode having a substitution list containing exactly one edgenode.

3. The method of claim 1 further comprising the step of traversing each edgenode of the packed representation using a depth-first traversal.

4. The method of claim 1 wherein the current forest object is replicated by a number equal to a number of edgenodes in the substitution list of a current edgenode when the number of edgenodes in the substitution list is greater than one.

5. The method of claim 4 further comprising the step of performing a vector update of the current forest object with the substitution list of the current edgenode.

6. The method of claim 4 further comprising the step of updating each of the replicated forest objects with an element corresponding to a different edgenode in the substitution list.

7. The method of claim 1 further comprising the step of setting a current edgenode to a root of the packed representation.

8. The method of claim 7 further comprising the step of setting the current forest object to an empty forest object.

9. The method of claim 8 further comprising the step of setting a next edgenode of the packed representation to a leftmost child of the current edgenode.

10. A program for decoding a packed representation of parses stored on computer readable medium comprising:
    computer readable program code for creating a current forest object;
    computer readable program code for traversing each edgenode of the packed representation; and
    computer readable program code for replicating the forest object for each edgenode having a substitution list of elements greater than 1.

11. The program of claim 10 wherein the forest object is replicated a number of times equal to the number of elements in the substitution list.

12. The program of claim 11 further comprising computer readable code for performing a scalar update of the current forest object for each edgenode having a substitution list containing exactly one edgenode.

13. The program of claim 10 further comprising computer readable code for updating each of the replicated forests with a treenode corresponding to one of the elements in the substitution list.

14. The program of claim 10 further comprising computer readable code for setting a current edgenode to a root edgenode of the packed representation, and for setting the current forest object to an empty forest object.

15. The program of claim 14 further comprising:
    computer readable program for setting next edgenode to a leftmost child of the current edgenode; and
    setting the current edgenode to the next edgenode.

16. The program of claim 15 further comprising
    computer readable program code for setting the next edgenode to a next one of the edgenodes in the substitution list when the current edgenode does not have at least one child.

17. The program of claim 16 further comprising
    computer readable program code for setting the current forest object to a forest object of the next one of the edgenodes in the substitution list.

18. The program of claim 17 further comprising
    computer readable program code for performing a node closure operation on a current forest object when the current edgenode in the last edgenode in the substitution list and when the current edgenode does not have a sibling to the right of the current edgenode.

19. The program of claim 18 further comprising
    computer readable program code for setting a next edgenode to null after the node closure operation, when the current edgenode does not have a parent.

20. The program of claim 18 further comprising
    computer readable program code for setting the current edgenode to parent of current edgenode, after the closure operation.

21. A system for decoding multiple parses comprising:
    a parser which receives output from a speech recognizer and creating parses stored in a packed representation, the packed representation including a plurality of edgenodes; each edgenode including a substitution list; and
    an unpacking program stored on a computer readable medium including program code for creating an unpacked forest including the steps of creating a current forest object, traversing each edgenode of the packed representation using a depth-first traversal, replicating the current forest object a number of times equal to the number of edgenodes in the substitution list, and updating each copy of the current forest object with a treenode corresponding to one of the edgenodes of the substitution list.

* * * * *